United States Patent [19] [11] 4,318,150
Eley [45] Mar. 2, 1982

[54] PROTECTED ELECTRICAL INDUCTIVE APPARATUS

[75] Inventor: Edgar R. Eley, Athens, Ga.

[73] Assignee: Westinghouse Electric Corp., Pittsburgh, Pa.

[21] Appl. No.: 104,222

[22] Filed: Dec. 17, 1979

[51] Int. Cl.³ ............ H02H 7/04

[52] U.S. Cl. ............ 361/41; 174/142; 337/199

[58] Field of Search ............ 361/41, 39; 174/142, 174/DIG. 10; 337/199, 202, 224

[56] References Cited

U.S. PATENT DOCUMENTS

| | | | |
|---|---|---|---|
| 2,732,419 | 1/1956 | Wilson | 174/142 |
| 3,231,666 | 1/1966 | Frink | 174/142 |
| 3,471,816 | 10/1969 | Giegerich | 337/195 |
| 3,480,898 | 11/1969 | Giegerich | 337/4 |
| 3,588,607 | 6/1971 | Ristuccia et al. | 361/41 |
| 3,628,092 | 12/1971 | Keto | 361/41 |
| 3,662,309 | 5/1972 | Harmon | 337/202 |
| 3,699,490 | 10/1972 | Macemon | 337/202 |
| 3,732,517 | 5/1973 | Keto et al. | 361/41 X |
| 3,792,215 | 2/1974 | Keto | 361/41 |
| 3,892,461 | 7/1975 | Keto | 339/111 |

*Primary Examiner*—Reinhard J. Eisenzopf
*Attorney, Agent, or Firm*—D. R. Lackey

[57] ABSTRACT

Protected liquid-filled electrical inductive apparatus having a dry well fuse assembly which includes a dry well fuse holder sealingly disposed through an opening in the associated metallic casing, separate from the electrical bushings, and a removable fuse portion. The dry well fuse holder includes first and second spaced terminals each having portions immersed in the liquid dielectric and portions accessible within the dry well for cooperative engagement with contacts on the removable fuse portion. The first terminal is closer to the metallic casing than the second terminal. Ionization of the air within the dry well fuse holder adjacent to the first terminal is prevented by a tubular shield member mounted on the outside of the dry well fuse holder. One of the axial end portions of the tubular shield member makes electrical contact with the immersed portion of the first terminal. After making such electrical contact, the inside diameter of the shield member then steps or flares outwardly to a larger inside diameter to provide a predetermined uniform spacing between the inner wall of the shield member and the outer wall of the dry well fuse holder. The shield member is dimensioned to extend towards the casing, past the end of the portion of the first terminal which is accessible from within the opening in the dry well fuse holder.

5 Claims, 1 Drawing Figure

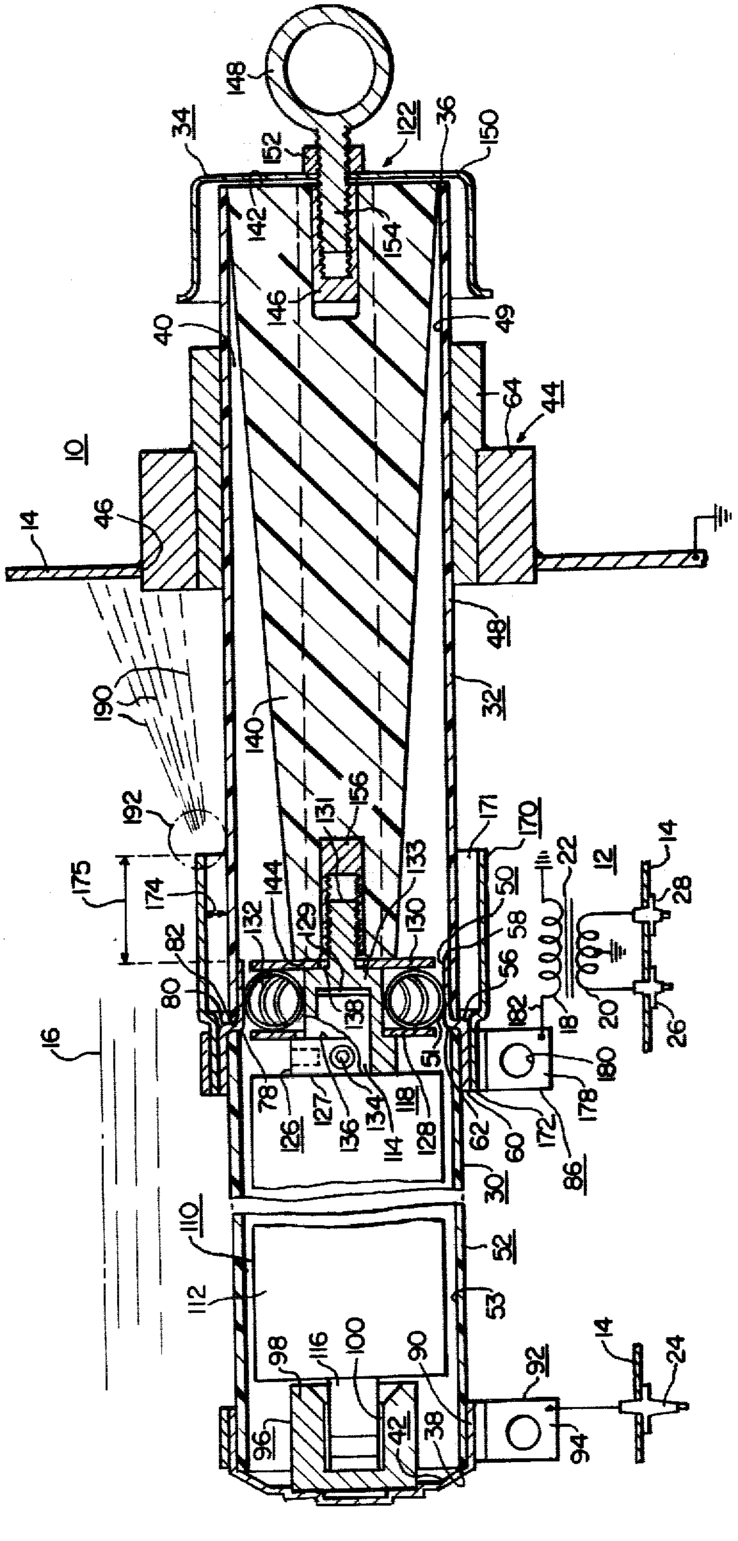

PROTECTED ELECTRICAL INDUCTIVE APPARATUS

BACKGROUND OF THE INVENTION

1. Field of the Invention

The invention relates in general to protected electrical inductive apparatus, and more specifically to liquid-filled pad-mounted electrical distribution transformers having a dry well fuse assembly sealingly mounted through a wall portion of the casing, separate from the electrical bushings.

2. Description of the Prior Art

Protective fuses, such as full range current limiting fuses are used to protect liquid-filled pad-mounted electrical distribution transformers by interrupting fault current flow before peak current is reached. To facilitate fuse replacement without breaking the casing seal, the current limiting fuse may be mounted in a dry well fuse holder which is sealingly disposed through an opening in the casing such that the two electrical terminals or connections to the fuse holder are immersed in the liquid dielectric. The two electrical terminals include portions accessible from within the air space of the dry well fuse holder, and they are configured such that they automatically make electrical contact with the electrical contact portions of the associated removable fuse assembly. The inner portion of one of the electrical terminals is necessarily closer to the grounded metallic casing of the inductive apparatus than the other terminal, and high electrical stresses exist between this terminal and the grounded casing. Ionization of the air within the dry well fuse holder must be prevented, as a flashover may occur along the inside wall of the fuse holder, from the electrical terminal to the grounded casing. With the increasingly higher operating voltages, BIL ratings, and BIL withstand requirements, the spacing between the closest terminal and the casing must be increased, which deleteriously affects the size and thus the cost of the pad-mounted transformer.

SUMMARY OF THE INVENTION

The present invention is a new and improved protected electrical inductive apparatus, such as a liquid-filled pad-mounted distribution transformer, having a dry well fuse assembly which includes an elongated dry well fuse holder sealingly mounted through the casing of the apparatus, independent of the electrical bushings. Two spaced electrical terminals on the fuse holder include portions immersed in the liquid dielectric, for connection between a bushing and a winding of the electrical apparatus, and portions accessible from within the air space of the fuse holder for connection to the two contact assemblies associated with the removable fuse portion of the assembly. The dry well fuse holder includes an electrostatic shield member formed of an electrically conductive material which is electrically connected to the liquid immersed portion of the terminal which is closest to the grounded metallic casing of the apparatus. The shield member is a round, hollow, or tubular member disposed co-axially with the longitudinal axis of the elongated dry well fuse holder. One axial end is in electrical contact with the terminal, and the other axial end extends toward the grounded casing for a dimension selected such that it extends past the end of the terminal which faces the grounded casing. After making electrical contact with the terminal, the shield member steps or flairs outwardly away from the adjacent outermost surface of the dry well fuse holder, to provide a predetermined spacing between the inner surface of the shield member and the outer surface of the fuse holder, which space is filled with the liquid dielectric. The shield member forms a large equipotential surface about the terminal and since it is at the same potential as the terminal, there is relatively little electrical stress between them. More importantly, the terminal member reshapes the electric field, transferring the electrical stress which would normally exist between the terminal and the grounded casing, to a path between the shield member and grounded casing. The portion of the shield member which faces the casing is spaced outwardly away from the outer wall of the fuse holder, and is thus immersed in the insulating liquid dielectric. Thus, the high electrical stress or potential gradient, instead of being in the air space of the dry well fuse holder, is transferred by the shield member out into the insulating liquid which has a much higher dielectric strength than air. The potential gradient within the air space of the fuse holder is reduced below the ionization level of the air.

BRIEF DESCRIPTION OF THE DRAWING

The invention may be better understood, and further advantages and uses thereof more readily apparent, when considered in view of the following detailed description of exemplary embodiments, taken with the accompanying drawings in which the single FIGURE is an elevational view of protected electrical inductive apparatus constructed according to the teachings of the invention.

DESCRIPTION OF PREFERRED EMBODIMENT

Referring now to the single FIGURE there is shown a fragmentary, elevational view, partially in section and partially schematic, of protected electrical inductive apparatus 10, such as a liquid-filled transformer of the pad-mounted distribution type, constructed according to an embodiment of the invention. Inductive apparatus 10 includes electrical winding means, such as magnetic core-winding assembly 12, shown schematically, disposed in grounded metallic tank or casing 14 which is filled to a predetermined level 16 with liquid dielectric means, such as mineral oil.

The magnetic core-winding assembly 12 is immersed in the liquid dielectric, and it includes high- and low-voltage windings 18 and 20, respectively, disposed in inductive relation with the magnetic core 22. One end of the high-voltage winding 18 is connected, via protective fuse apparatus 30, to the encased end of a high-voltage bushing 24, and the other end may be grounded, as shown, or connected to another high-voltage bushing via another protective fuse assembly, as required by the application. The weather end of the high-voltage bushing is adapted for connection to an alternating electrical potential, such as 60 Hz, 19.9 KV. The low-voltage winding 20 is connected to the encased end of low-voltage bushings 26 and 28, and the weather ends of the low-voltage bushings are adapted for connection to a load circuit.

Protective fuse apparatus 30 includes a substantially tubular elongated receptacle 32, and a removable fuse portion 34. Receptacle 32 has first and second ends 36 and 38, respectively, a longitudinal opening, cavity or chamber 40 which extends between its ends, means sealing the second end 38 of receptacle 32, such as a metallic cap member 42 formed of a good electrically conductive material, such as copper, brass or aluminum, and mounting means 44 for sealingly mounting receptacle 32 through an opening 46 in the casing 14. Opening 46 may be located in the front panel of the casing of the associated pad-mounted electrical distribution transformer. While receptacle 32 extends into the liquid dielectric, it is important to note that protective apparatus 30 is not of the oil circuit breaker type, as opening 40 in receptacle 30 is hermetically sealed from the liquid inside of the tank or casing 14, with the only access to opening 40 being through end 36 from outside the casing 14.

Receptacle 32 is formed of a plurality of tubular members, and in addition to the metallic cap member 42 and mounting means 44, it includes first, second and third axially aligned tubular members 48, 50 and 52, respectively, which provide first, second and third inner surfaces 49, 51 and 53, respectively. The first tubular member 48 has first and second ends 36 and 56, respectively, with end 36 also being the same as the first end of ptable 32.

The first tubular member 48 is a straight tube, filament wound of an oil-resistant electrical insulating material, such as a glass-filament polyester tube. A circumferential mounting flange 64 is suitably attached to the outer surface of the first tubular member 48, to form a part of the mounting means 44. Flange 64 may be a steel assembly adhesively attached to tube 48, with the assembly being suitable for welding the dry well receptacle 32 withing opening 46 of the casing, without destroying the adhesive seal.

The second tubular member 50 is formed of a good electrical conductor, such as copper, brass or aluminum, and it has a first inside diameter which defines a surface which starts at its first end 58 and extends to an outwardly stepped transition which includes first and second right angle bends 78 and 80, respectively, and a portion 82 disposed between the right angle bends. The second inside diameter, which is thus larger than the first inside diameter, starts at the second right angle bend 80 and extends to the second end 60 of the second tubular member 50. The portion of the second tubular member which includes the smaller first inside diameter extends into the opening 40 at the second end 56 of the first tubular member 48, and it is sealingly attached thereto.

The inner surface of the second tubular member 50 defined by the first or smaller of the two inside diameters provides a sliding electrical contact surface of a first stationary electrical terminal assembly 86. The first electrical terminal assembly 86 is adapted for connection to the high voltage winding 18, as will be hereinafter explained. It will be noted that the stepped construction of the second tubular member 50 results in the smaller diameter portion being in the air space defined by opening 40, and thus accessible from within the opening 40 of the dry well receptacle 32, and the larger diameter portion of the second tubular member 50 is in the liquid dielectric and accessible from the outside of receptacle 32.

The third tubular member 52 is a straight tube filament wound, of an oil-resistant electrical insulating material, such as a glass-filament polyester tube. The first end 62 of the third tubular member 52 is telescoped into the opening at the second end 60 of the second tubular member 50, with the outside diameter of tubular member 52 snugly fitting the second inside diameter of tubular member 50. A suitable adhesive joins the second and third tubular members 50 and 52, to provide an oil-tight seal.

As hereinbefore stated, metallic end cap 42 seals the second end of receptacle 32, and thus cap 42 is disposed to seal the second end of the third tubular member 52. As illustrated, cap 42 may be cup-shaped, having a side wall portion 90 which defines an opening having an inside diameter sized to snugly receive end 38 of the third tubular member 52. A suitable adhesive joins the cap 42 and tubular member 52, providing an oil-tight seal therebetween. Cap 42 is part of a second stationary electrical terminal assembly 92, with the external portion of the second electrical terminal 92 being completed by a metallic clamp or ring member 94 which is clamped about the outside diameter which defines the side portion 90 of the cup-shaped cap 42. Ring member 94, which is immersed in the liquid dielectric, includes means for attaching an electrical lead which extends to the electrical bushing 24.

The second electrical terminal 92 also includes an inner portion 96 suitably constructed to make electrical contact with a contact assembly of the removable fuse portion 34. For example, inner portion 96 may include a tubular cylindrical metallic member 98, formed of a suitable electrical conductor, such as copper, brass or aluminum, which has one axial end thereof brazed or otherwise mechanically and electrically connected to the inside surface of the base of metallic cap member 42. A suitable tubular metallic pressure terminal or contact 100 may be pressed into the opening in member 98. The inner wall portion of contact 100 is slotted to provide a plurality of small contact fingers which make pressure contact or engagement with a probe contact assembly on the removable fuse portion 34. Protective fuse apparatus 30 is illustrated as being a dead-break well. The invention applies equally to load-break wells, which eliminate the need for an auxiliary load-break switch. U.S. Pat. No. 3,628,092, which is assigned to the same assignee as the present application discloses suitable terminal structures for the load-break function.

The removable fuse portion 34 of apparatus 30 includes a fuse 110, which is preferably a fuse of the full-range, current limiting type. Suitable fuses of the current limiting type are disclosed in U.S. Pat. Nos. 2,496,704; 2,502,992 and 3,134,874, for example. The full-range current limiting fuse provides protection for the feeder system against faults in the electrical inductive apparatus, with the current limiting fuse extinguishing the arc at the designed let-through current, and it also protects the electrical inductive apparatus 10 against short circits and long-time overloads in the connected load circuit. It also protects operating personnel, as the current limiting fuse may be safely connected into a circuit having a low-impedance fault, as the current limiting fuse clears the circuit without initiating hazardous operating conditions.

Current limiting fuse 110 includes an insulating fuse tube 112 and first and second metallic electrodes 114 and 116 suitably attached thereto. First electrical contact means 118, and operating handle means 122, form an assembly to which the first metallic electrode 114 is secured. The second electrode 116 makes electrical contact with contact 100 when the removable fuse portion 34 is in assembled relation with the dry well fuse holder 32.

More specifically, the first electrical contact means 118 includes a metallic adapter 126, first and second In summary, there has been disclosed new and improved protected electrical inductive apparatus having a dry well type protective fuse assembly associated therewith which provides many advantages over protected electrical inductive apparatus of the prior art. For a given spacing between the closest electrical terminal of the fuse apparatus and the grounded casing of the inductive apparatus, the apparatus of the invention provides a higher BIL withstand voltage. For any given BIL rating, the protective fuse apparatus of the invention may have a shorter axial length than protective fuse apparatus of the prior art, minimizing interference problems between the protective fuse apparatus and the internal components of the electrical inductive apparatus.

I claim as my invention:

1. Protected electric inductive apparatus, comprising:
a metallic casing having primary and secondary electrical bushings and an opening,
liquid dielectric means disposed in said casing,
electrical winding means disposed in said casing and immersed in said liquid dielectric means,
protective fuse apparatus including a tubular receptacle and a removable fuse portion,
said receptacle having first and second ends, a wall portion having an inner surface which defines an air space which extends between its ends, means sealing the opening at its second end, said first and second spaced electrical terminals each having portions which are respectively accessible from the inside and outside of said tubular receptacle,
means sealingly mounting said receptacle through the opening in said casing to prevent the liquid dielectric means from entering the air space, with the first end of the receptacle being accessible outside the casing, and the second end extending into said casing such that at least the first and second spaced electrical terminals are immersed in said liquid dielectric means,
means electrically connecting the outer portions of said first and second spaced electrical terminals to a primary bushing and said electrical winding means, respectively,
said removable fuse portion having first and second ends, including handle means at the first end and fuse means adjacent to the second end, said removable fuse portion including first and second electrical contact means which engage the inner portions of said first and said electrical terminals, respectively, when the removable fuse portion is in assembled relation with said receptacle,
said first electrical terminal including a first tubular member having first and second axially spaced ends, with the first end being part of the inner portion of the first electrical terminal, said first end being the closest live element within the air space of said receptacle to said metallic casing when the primary bushing is connected to a source of electrical potential, providing an electric field between said first end and said casing,
and means electrically connected to said first electrical terminal for reshaping said electric field to transfer the high potential gradient which would normally exist adjacent to the first end of the first electrical terminal, outwardly away from the air space and into the liquid dielectric.

2. The protected electrical apparatus of claim 1 wherein the means which reshapes the electric field includes a tubular metallic member which is at the same electrical potential as the first electrical terminal.

3. The protected electrical apparatus of claim hich defines a first inside diameter sized to make snug electrical contact with the portion of the first electrical terminal which is accessible from the outside of the tubular receptacle.

4. The protected electrical apparatus of claim 3 wherein the second tubular metallic member includes a second portion which has an inside diameter selected to provide a predetermined spacing between its inner wall and the outer surface of the wall portion of the receptacle, which spacing is filled with the liquid dielectric means.

5. The protected electrical apparatus of claim 4 wherein the second tubular metallic member extends toward the metallic casing, with the spacing between the second tubular metallic member to the casing being less than the spacing between the first end of the first tubular metallic member and the casing.

* * * * *